United States Patent
Deutloff et al.

(10) Patent No.: US 9,211,877 B2
(45) Date of Patent: Dec. 15, 2015

(54) ACTUATOR, PARTICULARLY FOR A MOTOR VEHICLE PARKING BRAKE

(75) Inventors: Norbert Deutloff, Thüngersheim (DE); Ekkehard Kraft, Retzstadt (DE); Stephan Roos, Wertheim (DE); Armin Sauer, Arnstein (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 1734 days.

(21) Appl. No.: 12/161,082

(22) PCT Filed: Nov. 30, 2006

(86) PCT No.: PCT/EP2006/069101
§ 371 (c)(1),
(2), (4) Date: May 20, 2010

(87) PCT Pub. No.: WO2007/087914
PCT Pub. Date: Aug. 9, 2007

(65) Prior Publication Data
US 2010/0219029 A1    Sep. 2, 2010

(30) Foreign Application Priority Data
Jan. 16, 2006   (DE) .......................... 10 2006 002 062

(51) Int. Cl.
*B60T 13/74*    (2006.01)
*B60T 7/08*    (2006.01)

(52) U.S. Cl.
CPC ............... *B60T 13/746* (2013.01); *B60T 7/085* (2013.01)

(58) Field of Classification Search
CPC .............................. B60T 7/085; B60T 13/746
USPC .............. 188/1.11, 2 D, 162, 72.8, 156, 265
See application file for complete search history.

(56) References Cited

U.S. PATENT DOCUMENTS 3,161,074 A * 12/1964 Korthaus et al. ............. 74/89.34
5,092,432 A *  3/1992 Taig ............................ 188/72.3
(Continued)

FOREIGN PATENT DOCUMENTS

DE    10102685 A1    1/2002    ............. B60T 13/74
DE    10343131       9/2003    ............. B60T 13/74
(Continued)

OTHER PUBLICATIONS

International Search Report and Written Opinion; PCT/EP2006/069101; pp. 10, Jun. 6, 2007.

*Primary Examiner* — Robert A Siconolfi
*Assistant Examiner* — James Hsiao
(74) *Attorney, Agent, or Firm* — Westman, Champlin & Koehler, P.A.

(57) ABSTRACT

An actuator (1), especially for a motor vehicle parking brake has a telescopic device (2) that actuates a brake cable (6), and a drive unit which is equipped with an electromechanical drive for actuating the telescopic device (2). The actuator (1) further has a displacement sensor unit for detecting the actuating travel of the telescopic device (2) as well as a force sensor unit for detecting the force applied to the brake cable (6) by the drive unit. The displacement sensor unit and the force sensor unit are disposed next to each other in or on the housing (3) of the telescopic device (2) while being separated from the brake cable (6). The assembly has a particularly simple and compact design while reducing the constructive and mounting effort required during the production of the actuator.

23 Claims, 5 Drawing Sheets

(56) References Cited

U.S. PATENT DOCUMENTS

| | | | |
|---|---|---|---|
| 5,180,038 A * | 1/1993 | Arnold et al. | 188/171 |
| 5,775,469 A * | 7/1998 | Kang | 188/267 |
| 5,950,543 A * | 9/1999 | Oster | 104/138.1 |
| 6,213,259 B1 * | 4/2001 | Hanson et al. | 188/156 |
| 6,249,737 B1 | 6/2001 | Zipp | 701/70 |
| 6,533,082 B2 * | 3/2003 | Gill et al. | 188/156 |
| 6,609,595 B2 * | 8/2003 | Flynn et al. | 188/156 |
| 6,978,870 B2 | 12/2005 | Powrozek et al. | 188/156 |
| 7,052,427 B2 * | 5/2006 | Kapaan et al. | 475/4 |
| 7,648,006 B2 * | 1/2010 | Deutloff et al. | 188/2 D |
| 8,061,490 B2 * | 11/2011 | Di Stefano et al. | 188/162 |
| 8,235,181 B2 * | 8/2012 | Sano et al. | 188/2 D |
| 8,662,263 B2 * | 3/2014 | Deutloff et al. | 188/162 |
| 2003/0227010 A1 * | 12/2003 | Petrak | 254/294 |
| 2005/0115774 A1 * | 6/2005 | Nieto Gil et al. | 188/2 D |
| 2005/0225166 A1 * | 10/2005 | Greenberg et al. | 303/89 |
| 2007/0240950 A1 | 10/2007 | Deutloff et al. | 188/265 |

FOREIGN PATENT DOCUMENTS

| | | | |
|---|---|---|---|
| DE | 10361127 A1 | 7/2005 | F16H 25/20 |
| EP | 0966376 B1 | 7/2002 | B60T 7/10 |
| EP | 0988203 B1 | 8/2004 | B60T 13/74 |
| EP | 1593569 | 5/2005 | B60T 8/00 |
| EP | 1619398 | 1/2006 | F16C 1/22 |
| WO | 2005061293 | 7/2005 | B60T 7/10 |

* cited by examiner

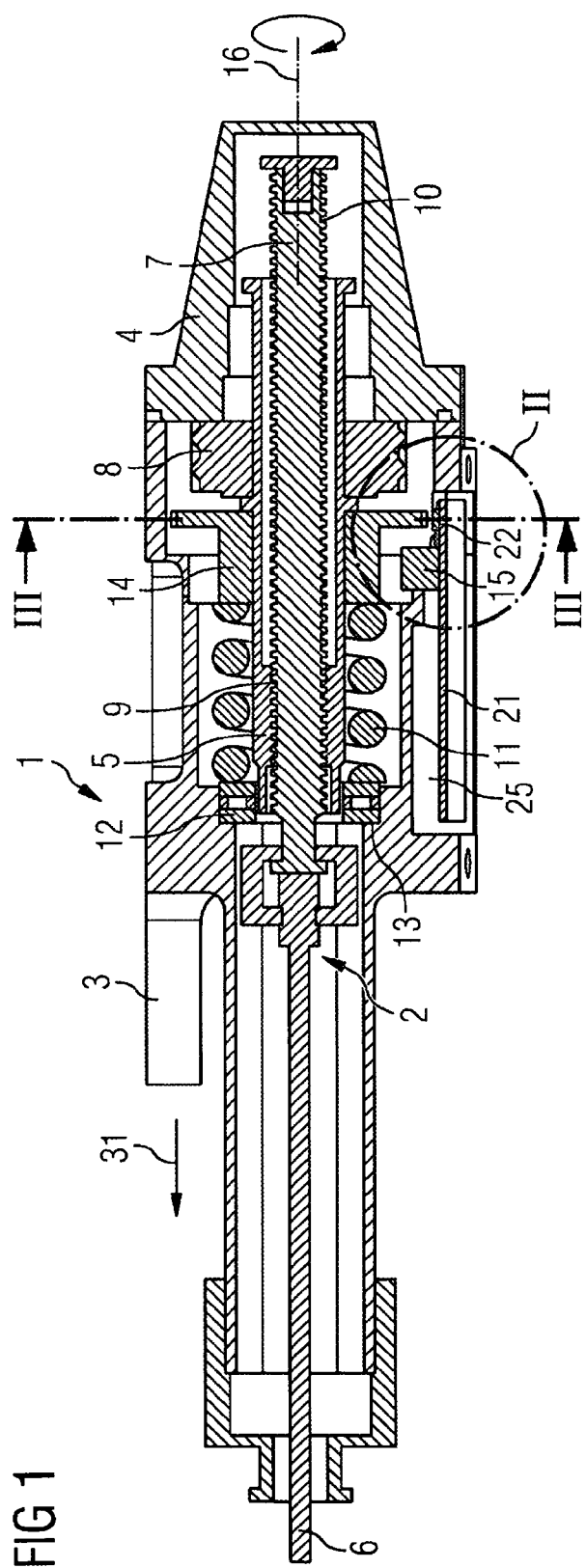
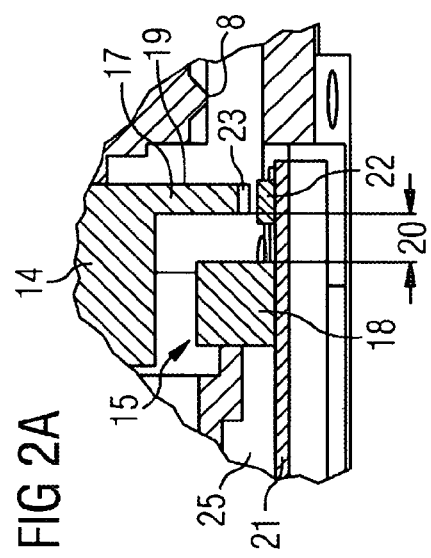
FIG 1
FIG 2A

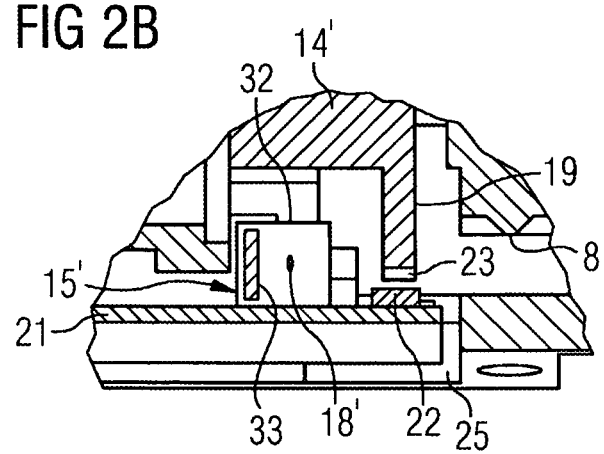
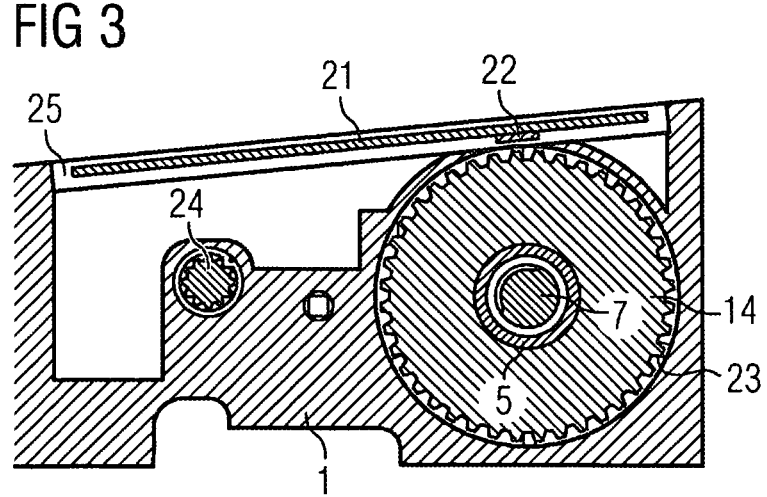

ACTUATOR, PARTICULARLY FOR A MOTOR VEHICLE PARKING BRAKE

CROSS-REFERENCE TO RELATED APPLICATIONS

This application is a U.S. national stage application of International Application No. PCT/EP2006/069101 filed Nov. 30, 2006, which designates the United States of America, and claims priority to German Application 10 2006 002 062.6 filed Jan. 16, 2006, the contents of which are hereby incorporated by reference in their entirety.

TECHNICAL FIELD

The invention relates to an actuator, in particular for a motor vehicle parking brake, with an actuating unit comprising an electromechanical drive.

BACKGROUND

From prior art, for example from Document EP 0 966 376 B1, it is known to monitor the application and release of tension on the brake cable in motor vehicle parking brakes, in particular in electronically controlled parking brakes that have an electromechanical drive. To this end a force measurement is implemented to detect the force applied to the brake cable and a distance measurement is implemented to detect adjustment travel of the brake cable already covered. This requires both a sensor system to measure the force and also a further sensor system to measure the distance.

For force measurement, a force sensor is disposed in or on the actuating cable for the direct detection of the force applied to the actuating cable. The distance is measured by means of a displacement sensor assigned to the actuating cable, the signals of said displacement sensor being fed to the control device as input variables. In this way, the sensor signals from two sensor units that are at different positions of the brake cable and hence remote therefrom, even possibly outside the actual drive unit and separate from the control unit, must be brought together to the evaluating unit located in the control unit, for example a processor. Complicating the matter is the fact that the sensor units must move along with the stroke of the actuating cable. This requires additional signal lines and costly circuit work, such as, for example, the laying of flexible lines or flexible line carriers.

SUMMARY

An actuator, in particular for a motor vehicle parking brake, can be provided with an actuating unit comprising an electromechanical drive and sensor devices for measuring the stroke and cable force. This can be of a particularly simple and compact design and may at the same time reduce the constructive and mounting effort required during the production of the actuator.

According to an embodiment, an actuator may comprise—a drive device comprising an electromechanical drive,—a telescopic device that actuates a brake cable in a housing, which is drivingly-connected to the drive device,—a displacement sensor unit for detecting the adjustment travel of the telescopic device, comprising a displacement signal sensor and a displacement signal receiver, and—a force sensor unit for detecting the force applied to the brake cable by means of the telescopic device, comprising a force signal sensor and a force signal receiver, wherein the displacement sensor unit and the force sensor unit being disposed spatially adjacent to each other in the housing of the telescopic device and separate from the brake cable.

According to a further embodiment, the displacement signal sensor and the force signal sensor may be combined in one assembly. According to a further embodiment, the displacement signal sensor and the force signal sensor may be combined in one single component. According to a further embodiment, the telescopic device may have a hollow shaft and a spindle shaft axially connected to said hollow shaft in a manner that enables it to rotate and advance as well as a drive gear wheel, which in respect of rotation and axial displacement is fixed to the hollow shaft in a defined fashion and which is drivingly-connected to the electromechanical drive, wherein the telescopic device in its housing being axially mounted in a movable fashion along the longitudinal axis of the actuating unit and being supported against the housing with a spring element. According to a further embodiment, the force signal sensor and/or the displacement signal sensor may be disposed on the hollow shaft. According to a further embodiment, displacement signal receiver and force signal receiver can be disposed adjacent to each other on a common support unit in or on the housing of the telescopic device in such a way that they can pick up the sensor signals from displacement signal sensor and force signal sensor. According to a further embodiment, the support unit may be a circuit support, on which further components of an electronic control unit of the actuator are disposed. According to a further embodiment, the displacement signal sensor can be a rotational travel sensor, which transmits one or several signals proportional to the rotational travel of a drive element to the displacement signal receiver or generates said signals with the help thereof. According to a further embodiment, the force signal sensor can be a translation displacement sensor, which transmits one or several signals proportional to a translational movement of the telescopic device against the spring element to the force signal receiver or generates said signals with the help thereof. According to a further embodiment, the force signal receiver and/or the displacement signal receiver may have a Hall element.

BRIEF DESCRIPTION OF THE DRAWINGS

The present invention is described in greater detail below with reference to exemplary embodiments, which are described with the help of the drawings, in which;

FIG. 1 shows a longitudinal section of a first embodiment of an actuator,

FIG. 2a shows an enlarged detailed view from FIG. 1,

FIG. 2b shows the detail from FIG. 2 in a further embodiment,

FIG. 3 shows a cross-section of the actuator from FIG. 1,

DETAILED DESCRIPTION

Figure 4:
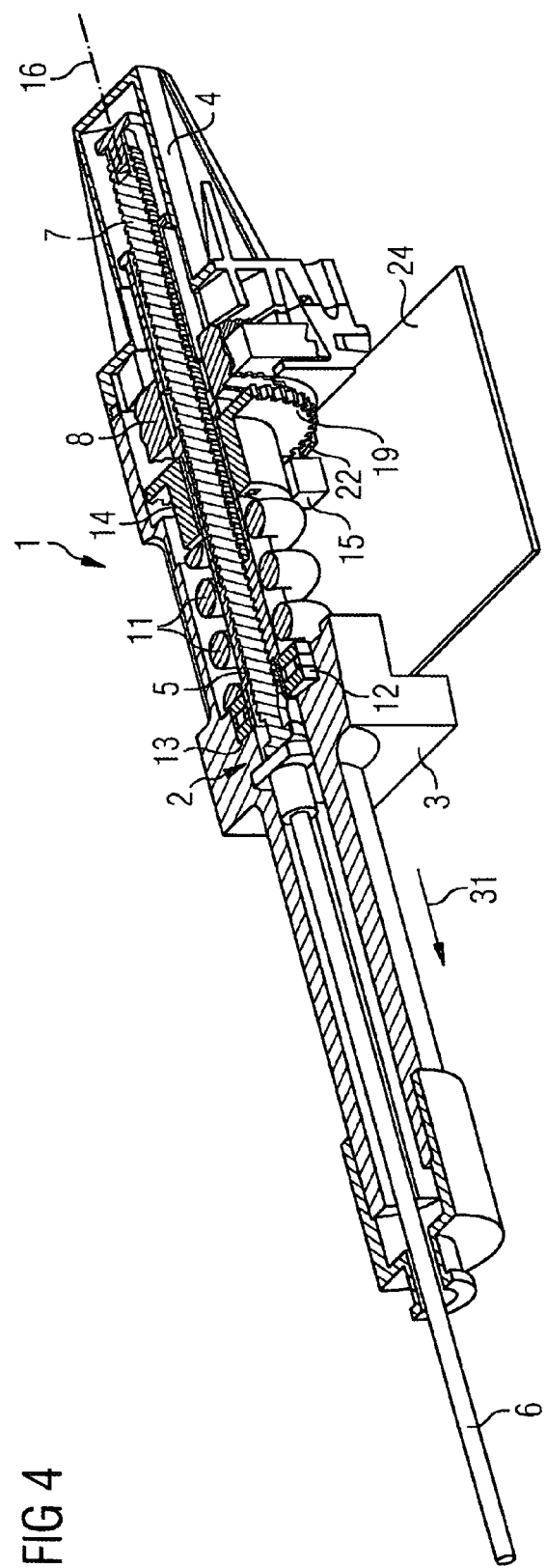
FIG. 4 shows a perspective sectional view of the actuator from FIG. 1.

The actuator according to an embodiment includes a drive device comprising an electromechanical drive and a telescopic device that actuates a brake cable, said telescopic device is in a housing and is drivingly-connected to the drive device. In addition the actuator has a displacement sensor unit for detecting the adjustment travel of the telescopic device with a displacement signal sensor and a displacement signal receiver, as well as a force sensor unit for detecting the force applied to the brake cable by means of the telescopic device with a force signal sensor and a force signal receiver. There the displacement sensor unit and force sensor unit are disposed spatially adjacent to each other in the housing of the telescopic device and separate from the brake cable.

According to various embodiments, the sensor units that were previously separate from each other and separate from the control unit may be replaced by a solution that cuts down on space and mounting effort. To this end, the displacement sensor unit and the force sensor unit are disposed adjacent to each other in the area of the telescopic device in or on the housing of the telescopic device. As this means that no additional housing or support components are required for the sensor units and for the signal line, then compared with the known solution, not only is the required installation space reduced but also the number of components and hence the effort required for mounting and the risk of errors.

In one embodiment, the displacement signal sensor and the force signal sensor are designed as a functional assembly. This has the advantage that the complete transmitter assembly can be pre-assembled in one pre-assembly step and built in as a unit in the final assembly. The common positioning of the two signal sensors together reduces additional measuring inaccuracies in terms of distance or force measurement as a result of faulty positionings.

In a further advantageous development, the displacement signal sensor and the force signal sensor are combined in a single component. In other words, only one single signal sensor is provided, which interacts both with the displacement signal receiver and also with the force signal receiver. This further reduces the space requirement and the production and mounting effort.

The axially guided movable arrangement of the telescopic device in a housing or similar on the longitudinal axis of the actuating unit is particularly advantageous, with the telescopic device having a hollow shaft and a spindle shaft that is axially connected to said hollow shaft in a manner that enables it to rotate and advance, and also a drive gear wheel. The drive gear wheel is attached to the hollow shaft and is fixed in respect of the rotation and axial displacement of said hollow shaft. The telescopic device is drivingly-connected to the electromechanical drive via the drive gear wheel.

The telescopic device is mounted in an axially movable fashion in its housing along its longitudinal axis and the longitudinal axis of the actuating unit and is supported against the housing by means of a spring element.

This embodiment has the advantage that the essential function elements are disposed spatially close to each other thus enabling the actuator to be of a very compact design.

In a further development of the above-mentioned arrangement, the force signal sensor and/or the displacement signal sensor are likewise disposed on the hollow shaft of the telescopic device. In this way the signal sensors are assigned directly to the central unit, which provides relevant, proportional and measurable variables in the form of rotational or translational movement both for distance measurement and also for force measurement purposes. This is a simple method of enabling the two sensor units to be disposed very close together.

A further advantageous effect is achieved if the displacement signal receiver and force signal receiver are disposed adjacent to each other on a common support unit in or on the housing of the telescopic device. The support unit can be designed as a lead frame, as a printed circuit board, as a housing part or as similar functional part. The arrangement of the support unit is chosen so that the displacement signal receiver and the force signal receiver operatively interacts with the signal sensors and can pick up the sensor signals from the displacement signal sensor or from the force signal sensor. This then also presents the possibility of combining and placing the signal receivers on one assembly and in one pre-assembly step. In the final assembly, only an installation and adjustment process is still required.

In a development of the above-mentioned embodiment, a circuit support, in particular a circuit board, is used as a support unit. Further components of an electronic control unit of the actuator are disposed on this circuit support in the same way as the signal receivers. This is advantageous in that the electronic components required to evaluate and further process the sensor signals can be disposed directly adjacent to the sensor units and can be electrically interconnected with each other. If necessary, the complete control electronics for the actuator can thus be accommodated on this circuit support and with said circuit support in the common housing with the telescopic device. This results in a particularly compact design and in addition the possibility of combining all the necessary electronics on one assembly and in one manufacturing process. As already mentioned above, the hollow shaft of the telescopic device is particularly suitable for this.

In an embodiment, the displacement signal sensor of the displacement sensor unit is designed as a rotational travel sensor, which transmits one or several signals proportional to the rotational travel of a drive element to the displacement signal receiver or generates said signals with the help thereof. This can be, for example, a sensor wheel with regular toothing on its perimeter interacting with an active Hall sensor element, a slotted or perforated disk interacting with a light barrier, a magnetic wheel magnetized with alternating polarity interacting with a passive Hall sensor element, a rotary potentiometer or another solution for measuring a relative or absolute rotational travel known to the person skilled in the art. The rotational travel sensor is connected to any rotating functional part of the drive unit or of the gear transmission including the telescopic device, the number of revolutions of which functional part is proportional to the stroke of the telescopic device. Preferably a functional part is chosen for this that is disposed in the vicinity of the force sensor unit. This enables the actuator to be of a particularly compact design.

A further advantageous embodiment is characterized in that the force signal sensor is a translation displacement sensor, which transmits one or several signals proportional to a translational movement of the telescopic device against the spring element to the force signal receiver or generates said signals with the help thereof. In this case through the spring constant of the spring element, for example a spiral spring, an unequivocal connection between the displacement traveled against the spring element and the force generated can be used in order to determine the tractive force generated. In principle, any type of distance or displacement measurement can be used. Examples of this are inductive distance measurement, linear potentiometer or also optical distance measurement. Such an embodiment represents a particularly simple and robust type of force measurement. In addition when combined with a rotational travel sensor for determining the adjustment travel as described above this offers the possibility of determining both the variables that are to be measured on one component of the actuating unit, namely of the hollow shaft of the telescopic device. Thereby the rotation of the hollow shaft provides a measurement for the adjustment travel and the translatory motion for the actuating force.

A particularly simple and robust embodiment in respect of the sensor units is produced when the force signal receiver and/or the displacement signal receiver has a Hall element. Hall elements react to magnetic fields and can be designed both as so-called active or prestressed signal receivers as well as passive signal receivers. In the first case, the Hall element is permanently applied with a magnetic field. The associated signal sensor generally consist of a ferromagnetic material and moves within the magnetic field which results in a change being generated in the magnetic field, which change can be measured using the Hall element. In the passive design, the Hall element is applied with a magnetic field by a signal sensor that has magnetization, said magnetic field changing when the signal sensor moves in relation to the Hall element. This change can again be measured using the Hall element.

FIG. 1 shows an actuator 1 in the form of an actuator for a motor vehicle parking brake, wherein an axially movable telescopic device 2 is accommodated by a housing 3 with an axially closing housing cover 4. The telescopic device 2 comprises a hollow shaft 5 and a spindle shaft 7 which is axially connected to said shaft in a manner that enables it to rotate and advance, actuates a brake cable 6 and is connected at its left end with the brake cable 6.

When driving the telescopic device 2 in terms of a movement of the brake cable 6 towards the right, i.e. in terms of applying a motor vehicle parking brake (not shown in detail here), there occurs thereby an axial translatory motion of the spindle shaft 7 towards the right as shown in FIG. 1, wherein FIG. 1 shows a brake position when the brake cable is under tension. A torque is transferred from an electric motor of a drive device (not shown) via a transmission (not shown in more detail) to a drive gear wheel 8 in the form of a gear wheel. In relation to rotation and axial translation, the drive gear wheel 8 has a rigid drive connection to the hollow shaft 5 and can be moved together with said shaft axially relative to the housing 3. The hollow shaft 5, rotated by the drive gear wheel 8, has an internal thread 9. By means of this internal thread 9, the spindle shaft 7 produces an axial advance movement using the intermeshing external thread 10 of the spindle shaft 7.

The hollow shaft 5 or the spindle shaft 7 is concentrically encompassed by a spring element 11, here in fact a helical spring. Said helical spring lies as a pressure spring with its one axial end over a fixed axial thrust bearing 12 against a shoulder 13 of the housing 3 and with its other axial end against a signal sensor element 14. When the actuator is applied or released, the signal sensor element 14 disposed on the hollow shaft 5 moves with the hollow shaft 5 axially to the left or to the right parallel to the longitudinal axis 31 of the actuator 1. The travel covered thereby is detected with the help of a fixed, stationary signal receiver, represented here by the force signal receiver 15, and presents a measurement for the tensioning force or brake force applied to the brake cable 6 by the drive device via the drive gear wheel 8, the hollow shaft 5 and the spindle shaft 7. In other words, this travel information from the signal sensor element 14 allows conclusions to be drawn as to the applied cable force.

The signal sensor element 14, which, when the actuator 1 is activated, rotates together with the helical spring 11 around the spindle axis 16, has a magnet 17, which, interacting with a Hall element 18 in the force signal receiver 15, enables the distance between the signal sensor element 14 and Hall element 18 to be detected (cf. FIG. 2a). The signal sensor element 14 has a circumferential collar 19, the distance 20 of which from the Hall element 18 serves as a measurement for the force applied to the brake cable 6.

Instead of the above-mentioned embodiment, one can also use a so-called prestressed force signal receiver 15', which includes a magnet 33 in addition to the Hall element 18' in the sensor element housing 32, cf. FIG. 2b. The movement of a signal sensor element 14', which is produced from a ferritic material or is a ferrite, causes a change in the magnetic field.

In the direct vicinity of the Hall element 18 of the force signal receiver 15, 15' and on the same circuit support 21, here a circuit board, as said Hall element, a further sensor element is disposed, the displacement signal receiver 22 for detecting the adjustment travel. The position of this displacement sensor receiver 22 is chosen in such a way that, while the actuator 1 is being activated, the teeth 23 disposed on the perimeter of the collar 19 are directed past and in the immediate vicinity of the signal sensor element 14. This allows a specific number of pulses to be detected per rotation, i.e. the rotational travel of the signal sensor element 14, cf. FIG. 3, which depicts a section through the actuator along line III-III. In other words the adjustment travel is detected in such a way that counted pulses are assigned to the rotational travel of the signal sensor element 14 covered and again the rotational travel is proportional to the adjustment travel of the telescopic device. Use is made here on the one hand of a displacement signal receiver 22 with a Hall element 18 and on the other hand of a displacement signal sensor 14 manufactured from a magnetic material or having a magnet. As an alternative to this assembly, a displacement signal receiver 22' with an active Hall element and a ferritic signal sensor element 14' can also be used.

As the force signal receiver 15 and displacement signal receiver 22 are operated via one and the same signal sensor element 14, which is axially movable in respect of the spindle axis 16 and can be rotated around the spindle axis 16, the circuit support 21 must be aligned solely to the position of the spindle axis 16. In contrast, the relative position of the circuit support 21 in respect of the motor axis 24 for example is irrelevant. The circuit support 21 is thereby accommodated and positioned in a corresponding receiving chamber 25 of the housing 3.

FIG. 4 shows a perspective view of the described exemplary embodiment, with the housing 3 and telescopic device 2 and also spring element 11, signal sensor element 14 and drive gear wheel 8 being intersected longitudinally.

Figure 5:
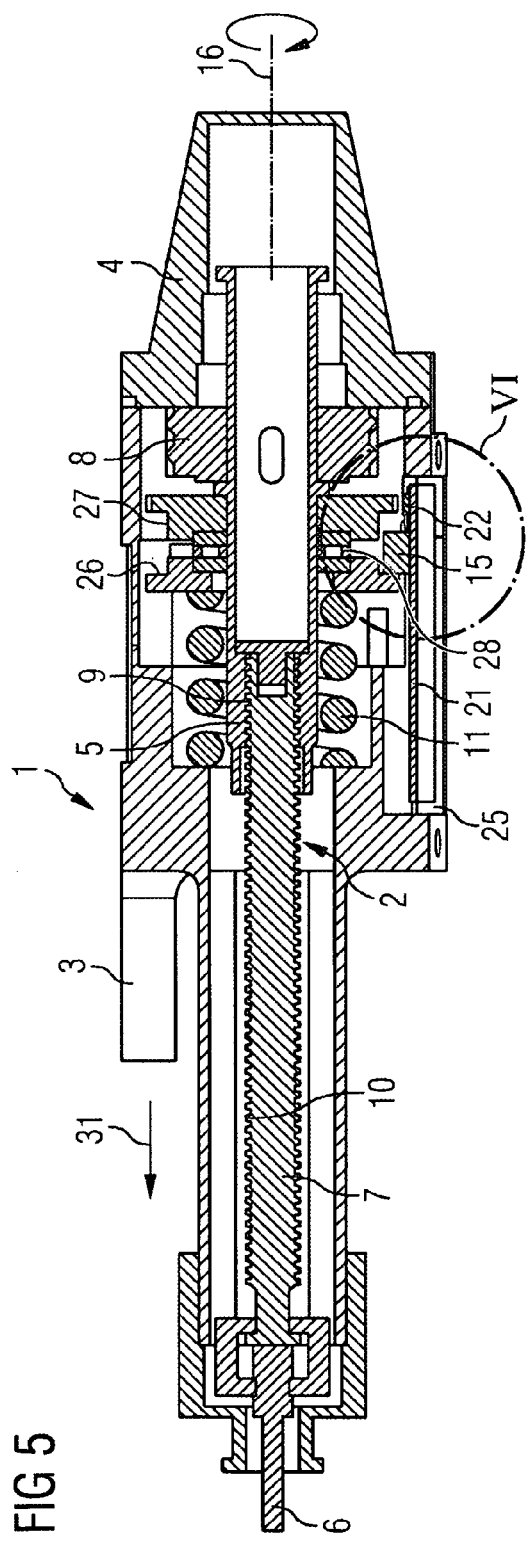
FIG. 5 shows a longitudinal section of the second embodiment of an actuator.
Figure 6:
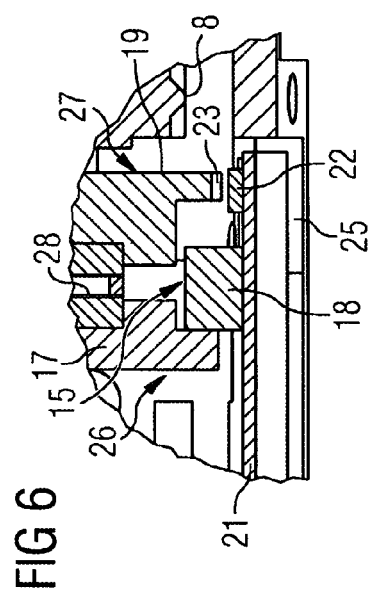
FIG. 6 shows an enlarged detailed view from FIG. 5.
Figure 7:
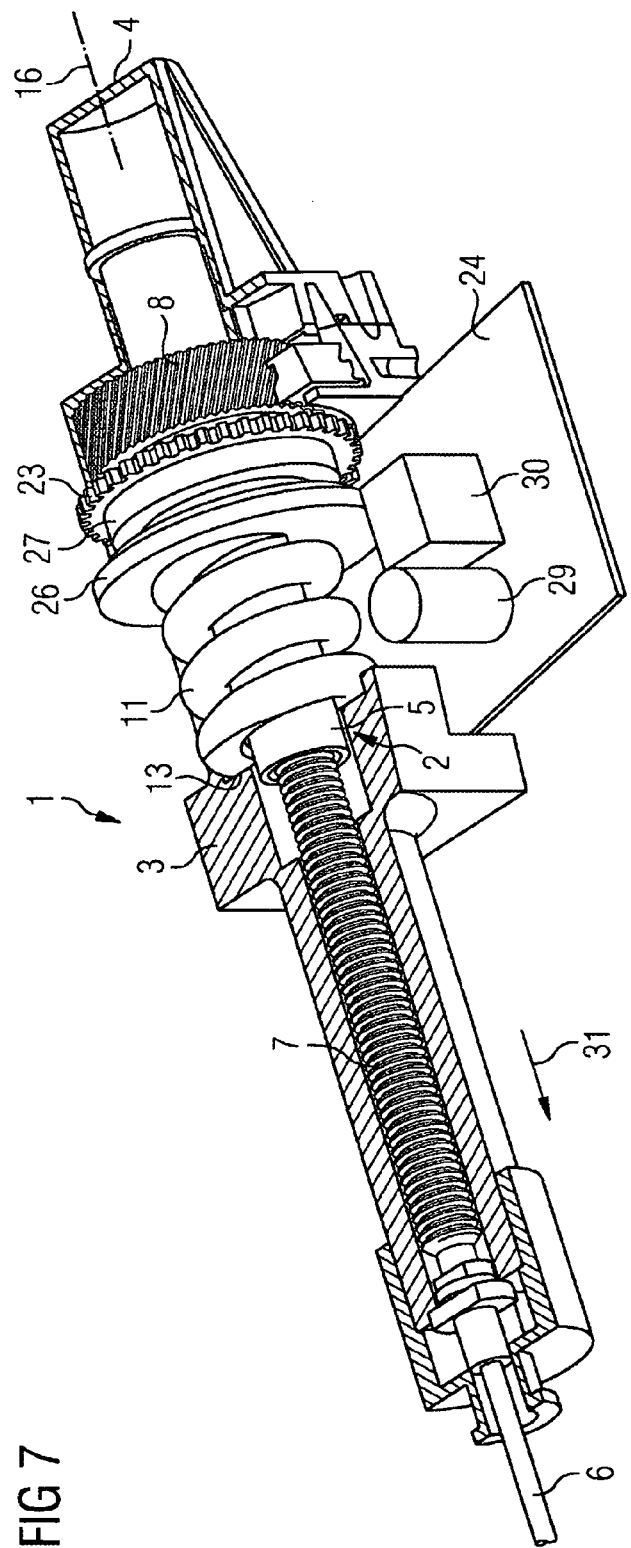
FIG. 7 shows a perspective view of the actuator from FIG. 5.

FIG. 5 shows a second embodiment. Instead of a signal sensor element provided jointly for force signal receiver 15 and displacement signal receiver 22, a force signal sensor 26 and a displacement signal sensor 27 are provided, which are combined into one assembly and connected to each other via an axial roller bearing 28, as is also illustrated in FIG. 7. When the actuator 1 is activated, the force signal sensor 26 and spring element 11 do not rotate along with the hollow shaft 5. This is advantageous in that any wobbling motions of the force signal sensor 26 caused by its rotational movement are avoided and hence the measurement accuracy is improved.

With this embodiment, the force signal receiver 15 for determining force and the displacement signal receiver 22 for determining the adjustment travel are disposed in direct vicinity to each other on a common support element 21, a circuit board. FIG. 5 shows the state of a released brake cable 6, where the brake cable has traveled to the left. The force signal sensor 26 with magnet 17 applied by the spring element 11 is used to determine the force affecting the brake cable 6 using a displacement measurement by means of a Hall element 18 in the force signal receiver 15. The spring element 11 is supported directly on the housing shoulder 13.

The displacement signal sensor 27, in interaction with the displacement signal receiver 22, assumes the function of displacement determination, for which purpose it also has teeth 23 disposed on the perimeter of the circumferential collar 19. A magnetic wheel that has magnetized segments of alternating polarity can be used instead of the toothed displacement signal sensor 27. In this way, the rotational travel is detected by the number of pole changes from "North Pole and South Pole" moving past the displacement signal receiver 22. This also applies to the common signal sensor element 14 according to the embodiment described above.

Here again, active (prestressed) as well as conventional passive Hall elements can be used for displacement signal receivers and/or force signal receivers. Depending on the application requirements a mixed use can also be provided, for example, such that the force sensor unit operates with a prestressed Hall element, while a passives Hall element is used for the displacement sensor unit.

In both embodiments, the force signal receiver 15 and displacement signal receiver 22 are provided on the circuit support 21 preferably as SMD modules (Surface Mounting Device). The Hall element 18 is designed here as an integrated circuit (Chip). In addition to further components such as capacitors 29 and relays 30, an evaluation and control circuit (not shown) can be disposed on the circuit board 21, which evaluation and control circuit is used to detect and further process the sensor signals and to control the actuator. The evaluation of the force or distance measurement is preferably used to control the drive device of the actuating unit by means of the control unit that is also disposed on the circuit support 21. When arranging the circuit support 21 in the housing 3, priority is given to using up existing free spaces so that the installation space required is as a whole minimized.

When evaluating the signals and processing them further into concrete adjustment travel and actuating force information, it should be noted that the adjustment travel variable, determined from the angular momentum, must be corrected on the basis of the detected distance information of the force sensor unit. This is necessary because the hollow shaft 5 of the telescopic device 2 moves axially against the adjustment travel of the brake cable 6 when the force increases and the drive device continues to be activated. This travel covered by the hollow shaft 5 against the spring element 11 must be deducted from the adjustment travel corresponding to the angular momentum count.

According to various embodiments, neither the force sensor unit nor the displacement sensor unit are coupled to the brake cable, and, in addition, are also not integrated into the force transmission path from the electromechanical drive up to the brake cable. Therefore, the sensor units can be positioned at various selectable positions in the drive or transmission unit and be fixed in these positions. This allows the actuator to be of a particularly compact design. A miniaturization of the force sensor unit is also possible, as the mechanical load is significantly reduced or completely non-existent. This also contributes to a comparatively compact design.

Instead of sensor units based on a magnetic measurement principle, other sensor principles, for example a system based on optical scanning or similar, can also be used.

The invention claimed is:

1. An actuator comprising:
a drive device comprising an electromechanical drive;
a telescopic device that actuates a brake cable;
wherein the telescopic device is mounted in a housing in an axially movable fashion;
wherein the telescopic device comprises a rotatable hollow shaft and a spindle shaft, the spindle shaft being connected to the hollow shaft in such a manner that by rotation of the hollow shaft, the spindle shaft can be axially advanced; and
wherein the telescopic device is drivingly-connected to the drive device in such a manner that the hollow shaft can be driven so as to rotate;
a displacement sensor unit for detecting the adjustment travel of the telescopic device, comprising a displacement signal sensor and a displacement signal receiver; and
a force sensor unit for detecting the force applied to the brake cable by means of the telescopic device, comprising a force signal sensor and a force signal receiver;
wherein the displacement sensor unit and the force sensor unit are disposed spatially adjacent to each other in the housing of the telescopic device and separate from the brake cable;
wherein the displacement signal sensor is a rotational travel sensor;
wherein the force signal sensor is a translation displacement sensor;
wherein the force signal sensor and the displacement signal sensor are provided in such a manner that the rotation of the hollow shaft provides a measurement for the adjustment travel of the telescopic device and the translatory motion of the hollow shaft provides a measurement for the force applied, and
wherein the adjustment travel of the telescopic device and the force applied to the brake cable are detected in such a manner that the adjustment travel of the brake cable is obtainable by deducting a travel of the hollow shaft detected by the force sensor unit from the adjustment travel of the telescopic device detected by the displacement sensor unit.

2. The actuator according to claim 1, wherein the displacement signal sensor and the force signal sensor are combined in one assembly.

3. The actuator according to claim 1, wherein the displacement signal sensor and the force signal sensor are combined in one single component.

4. The actuator according to claim 1, wherein the telescopic device is supported against the housing by means of a spring element.

5. The actuator according to claim 1, wherein the force signal sensor and/or the displacement signal sensor are/is disposed on the hollow shaft.

6. The actuator according to claim 1, wherein the displacement signal receiver and the force signal receiver are disposed adjacent to each other on a common support unit in or on the housing of the telescopic device in such a way that they can pick up the sensor signals from the displacement signal sensor and the force signal sensor.

7. The actuator according to claim 6, wherein the support unit is a circuit support, on which further components of an electronic control unit of the actuator are disposed.

8. The actuator according to claim 1, wherein the displacement signal sensor transmits one or several signals proportional to the rotational travel of a drive element to the displacement signal receiver or generates said signals with the help thereof.

9. The actuator according to claim 4, wherein the force signal sensor transmits one or several signals proportional to a translational movement of the telescopic device against the spring element to the force signal receiver or generates said signals with the help thereof.

10. The actuator according to claim 1, wherein the force signal receiver or the displacement signal receiver has a Hall element.

11. The actuator according to claim 1, wherein the force signal receiver and the displacement signal receiver has a Hall element.

12. The actuator according to claim 1, wherein the actuator is part of a motor vehicle parking brake system.

13. A method for operating an actuator comprising the steps of:
providing a drive device comprising an electromechanical drive;
actuating a brake cable by a telescopic device, wherein
the telescopic device is drivingly-connected to the drive device,
the telescopic device being mounted in a housing in an axially movable fashion and comprising a rotatable hollow shaft and a spindle shaft connected to the hollow shaft;
detecting the adjustment travel of the telescopic device by a displacement sensor unit comprising a displacement signal sensor and a displacement signal receiver; and
detecting the force applied to the brake cable by means of the telescopic device by a force sensor unit comprising a force signal sensor and a force signal receiver;
wherein the displacement sensor unit and the force sensor unit are disposed spatially adjacent to each other in the housing of the telescopic device and separate from the brake cable;
wherein the displacement signal sensor is a rotational travel sensor;
wherein the force signal sensor is a translation displacement sensor; and
wherein by means of the force signal sensor and the displacement signal sensor, both translational and rotational movement of the hollow shaft are determined.

14. The method according to claim 13, wherein the displacement signal sensor and the force signal sensor are combined in one assembly or in one single component.

15. The method according to claim 13, wherein the telescopic device is supported against the housing by means of a spring element.

16. The method according to claim 13, wherein the force signal sensor and/or the displacement signal sensor are/is disposed on the hollow shaft.

17. The method according to claim 13, wherein the displacement signal receiver and the force signal receiver are disposed adjacent to each other on a common support unit in or on the housing of the telescopic device in such a way that they can pick up the sensor signals from the displacement signal sensor and the force signal sensor.

18. The method according to claim 17, wherein the support unit is a circuit support, on which further components of an electronic control unit of the actuator are disposed.

19. The method according to claim 13, wherein the displacement signal sensor transmits one or several signals proportional to the rotational travel of a drive element to the displacement signal receiver or generates said signals with the help thereof.

20. The method according to claim 15, wherein the force signal sensor transmits one or several signals proportional to a translational movement of the telescopic device against the spring element to the force signal receiver or generates said signals with the help thereof.

21. The actuator according to claim 4, wherein the spindle shaft is axially connected to said hollow shaft in such a manner that the spindle shaft is axially advanced by rotation of the hollow shaft, and wherein the telescopic device further comprises a drive gear wheel, which in respect of rotation and axial displacement is fixed to the hollow shaft in a defined fashion and which is drivingly-connected to the electromechanical drive.

22. The method according to claim 15, wherein the spindle shaft is axially connected to said hollow shaft in such a manner that the spindle shaft is axially advanced by rotation of the hollow shaft, and wherein the telescopic device further comprises a drive gear wheel, which in respect of rotation and axial displacement is fixed to the hollow shaft in a defined fashion and which is drivingly-connected to the electromechanical drive.

23. An actuator comprising:
a drive device comprising an electromechanical drive;
a telescopic device that actuates a brake cable;
wherein the telescopic device is mounted in a housing in an axially movable fashion;
wherein the telescopic device comprises a rotatable hollow shaft and a spindle shaft, the spindle shaft being connected to the hollow shaft in such a manner that by rotation of the hollow shaft, the spindle shaft can be axially advanced; and
wherein the telescopic device is drivingly-connected to the drive device in such a manner that the hollow shaft can be driven so as to rotate;
a displacement sensor unit for detecting the adjustment travel of the telescopic device, comprising a displacement signal sensor and a displacement signal receiver; and
a force sensor unit for detecting the force applied to the brake cable by means of the telescopic device, comprising a force signal sensor and a force signal receiver;
wherein the displacement sensor unit and the force sensor unit are disposed separate from the brake cable;
wherein the displacement signal sensor is a rotational travel sensor, which transmits one or several signals proportional to the rotational travel of a drive element to the displacement signal receiver or generates said signals with the help thereof;
wherein the force signal sensor is a translation displacement sensor,
wherein the force signal sensor is provided in such a manner that the translatory motion of the hollow shaft provides a measurement for the force applied; and
wherein the adjustment travel of the telescopic device and the force applied to the brake cable are detected in such a manner that the adjustment travel of the brake cable is obtainable by deducting a travel of the hollow shaft detected by the force sensor unit from the adjustment travel of the telescopic device detected by the displacement sensor unit.

* * * * *